United States Patent
Blau et al.

(10) Patent No.: US 6,912,798 B2
(45) Date of Patent: Jul. 5, 2005

(54) REMOVABLE BOXING TAPE

(75) Inventors: Kerry Blau, Luxemburg, WI (US); Dan Shannon, Green Bay, WI (US)

(73) Assignee: Schreiber Foods, Inc., Green Bay, WI (US)

( * ) Notice: Subject to any disclaimer, the term of this patent is extended or adjusted under 35 U.S.C. 154(b) by 0 days.

(21) Appl. No.: 10/447,320

(22) Filed: May 28, 2003

(65) Prior Publication Data

US 2004/0237325 A1 Dec. 2, 2004

(51) Int. Cl.⁷ .................................................. C09J 7/02
(52) U.S. Cl. ..................... 33/758; 427/208; 428/194; 428/343; 428/354; 428/40
(58) Field of Search .................... 33/758; 427/208; 428/343, 194, 192, 354, 40, 40.1

(56) References Cited

U.S. PATENT DOCUMENTS

| | | |
|---|---|---|
| 1,167,338 A | 1/1916 | Crowell |
| 2,011,232 A | 8/1935 | Parks et al. |
| 2,299,461 A | 10/1942 | Clanon |
| 2,326,417 A | 8/1943 | Ullrich |
| 2,331,582 A | 10/1943 | Trost |
| 2,513,079 A | 6/1950 | Buerger |
| 2,555,526 A | 6/1951 | Zinn, Jr. |
| 2,657,851 A | 11/1953 | Wetzger |
| 2,661,138 A | 12/1953 | Leonard |
| 2,677,495 A | 5/1954 | Buttery |
| 2,918,205 A | 12/1959 | Zeitter |
| 3,076,588 A | 2/1963 | Conway et al. |
| 3,504,844 A | 4/1970 | Starke et al. |
| 3,506,181 A | 4/1970 | Farquhar et al. |
| 3,580,482 A | 5/1971 | Witte |
| 4,041,202 A | 8/1977 | Williams |
| 4,062,486 A | 12/1977 | Goodrich |
| 4,314,642 A | 2/1982 | Dagostine |
| 4,351,877 A | 9/1982 | Williams |
| 4,417,661 A | 11/1983 | Roccaforte |
| 4,582,737 A * | 4/1986 | Torgerson et al. .......... 427/208 |
| 4,741,935 A | 5/1988 | Sheehan |
| 5,054,618 A | 10/1991 | Kim |
| 5,340,629 A * | 8/1994 | Rodighiero ................. 428/41.8 |
| 5,593,756 A * | 1/1997 | Miller ......................... 428/194 |
| 5,660,922 A * | 8/1997 | Herridge et al. ............ 428/214 |
| 5,816,487 A | 10/1998 | Skinner |
| 5,979,749 A | 11/1999 | Bozich |
| 6,047,882 A | 4/2000 | Sin et al. |
| 6,073,833 A | 6/2000 | Desrosiers et al. |
| 6,089,447 A | 7/2000 | Sin et al. |
| 6,162,534 A * | 12/2000 | Hamerski ................... 427/208 |
| 6,237,243 B1 * | 5/2001 | Cook .......................... 33/758 |
| 6,449,794 B1 * | 9/2002 | Jaffri ........................... 428/43 |
| 6,541,089 B1 * | 4/2003 | Hamerski et al. .......... 428/40.1 |
| 6,663,932 B2 * | 12/2003 | McLaughlin et al. ...... 428/40.1 |
| 6,686,016 B2 * | 2/2004 | Downs ....................... 427/208 |
| 2001/0022035 A1 * | 9/2001 | Veloce ........................ 33/758 |
| 2002/0090496 A1 * | 7/2002 | Kim et al. .................. 428/201 |
| 2004/0086711 A1 * | 5/2004 | Backman et al. ........... 428/354 |

* cited by examiner

Primary Examiner—Christopher W. Fulton
Assistant Examiner—Yaritza Guadalupe
(74) Attorney, Agent, or Firm—Brinks Hofer Gilson & Lione

(57) ABSTRACT

The present invention concerns a length or roll of tape that has been designed to be easily removed. The tape has a substrate or film on which two opposingly located adhesive sections are formed. A non-adhesive section is also located on the substrate between the adhesive sections. The non-adhesive section forms a graspable handle at one end of the substrate which makes the tape easier to remove. The invention may also comprise a single adhesive and non-adhesive section which forms a graspable handle. In addition, the non-adhesive section may be substituted with a low strength adhesive section as well.

4 Claims, 2 Drawing Sheets

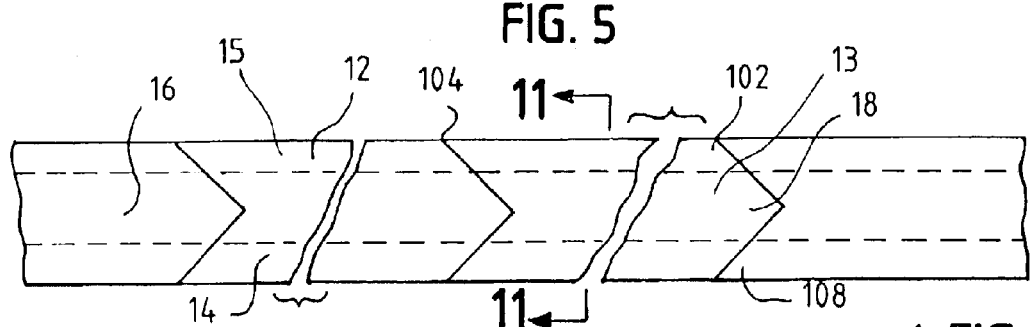
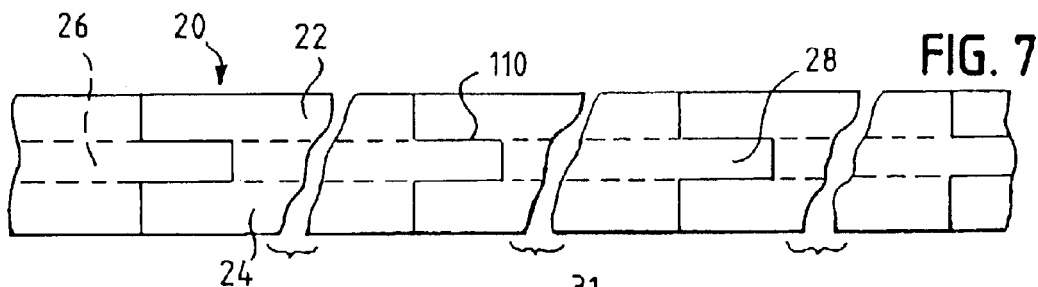
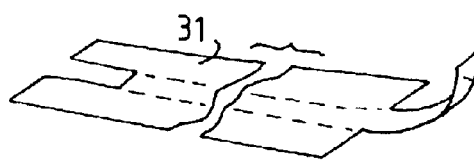
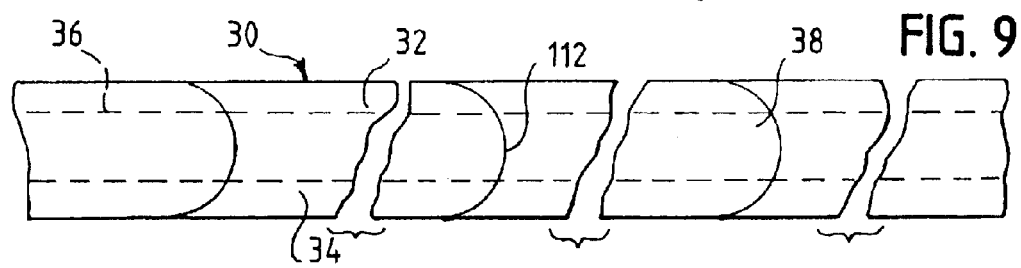
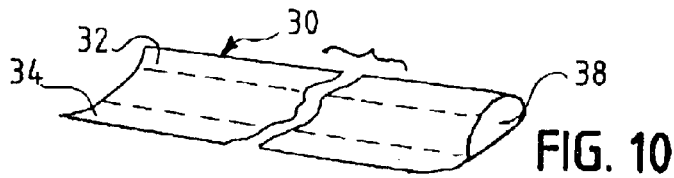
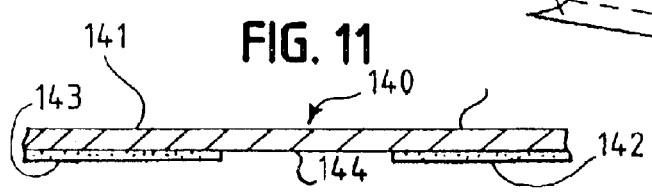
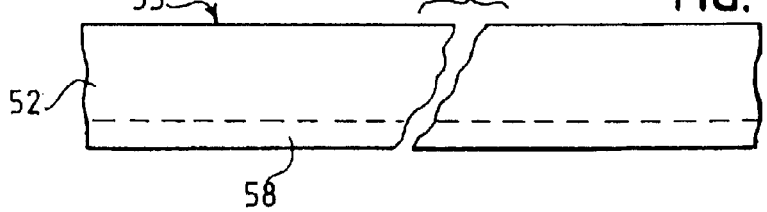
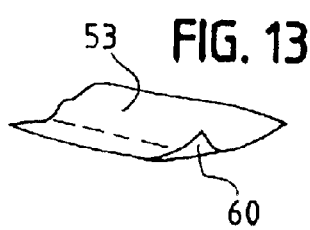

REMOVABLE BOXING TAPE

BACKGROUND OF THE INVENTION

The present invention concerns a tape used generally for sealing and/or creating cartons such as corrugated boxes. More specifically, the present invention concerns a tape which has an area devoid of adhesive or has coated thereon a releaseable adhesive. Configuring the tape in this manner forms a handle or graspable section which diminishes the difficulty in removing the tape. This, in turn, makes it easier to open the container.

SUMMARY OF THE INVENTION

Corrugated boxes and the like have long been made and/or sealed with tape. By its very design, the tape is intended to strongly adhere to the container so as to prevent inadvertent opening of the container during handling, shipping, storage and the like. This, in turn, makes it difficult to remove the tape when desired. Box cutters and the like are often used to cut the tape in order to open the carton. The use of a sharp object leads to other problems such as potential injury or damage to the contents of the container. Thus, there is a need for a tape that can satisfy the two competing needs of providing a strong seal while still being easily removed.

The present invention solves the above mentioned problems. It provides an effective seal by having an adhesive backing. It is also easily removed because a non-adhesive area is also provided which forms a tab, handle or graspable section which may be easily grasped so as to permit the tape to be pulled off of the container.

In another embodiment, a releaseable adhesive which has a lower adhesive strength than the other adhesive is used with the tape. The tab, handle or graspable section is adhered to the carton by the weaker adhesive so as to create a handle which is easily grasped so as to permit the tape to be pulled off of the container.

DESCRIPTION OF THE DRAWINGS

These and other features, objects and advantages of the present invention will become apparent from the following description and drawings wherein like reference numerals represent like elements in several views, and in which:

FIG. 5 is a top view of the embodiment shown FIG. 1.

FIG. 6 illustrates how a graspable handle maybe formed in accordance with the present invention.

FIG. 7 is a top view of an alternate embodiment of the present invention.

FIG. 8 illustrates how a graspable handle maybe formed in accordance with the embodiment shown in FIG. 7.

FIG. 9 is a top view of another embodiment of the present invention.

FIG. 10 illustrates how a graspable handle maybe formed in accordance with the embodiment shown in FIG. 9.

FIG. 11 is a cross sectional view of the embodiment shown in FIG. 1.

FIG. 12 is a top view of an alternate embodiment of the present invention.

FIG. 13 illustrates how a graspable handle maybe formed in accordance with the embodiment shown in FIG. 12.

DESCRIPTION OF THE PREFERRED EMBODIMENTS

Set forth below is a description of what are currently believed to be the preferred embodiments or best examples of the invention claimed. Future and present alternatives and modifications to the preferred embodiments are contemplated. Any alternates or modifications in which insubstantial changes in function, in purpose, in structure or in result are intended to be covered by the claims of this patent.

Figure 1:
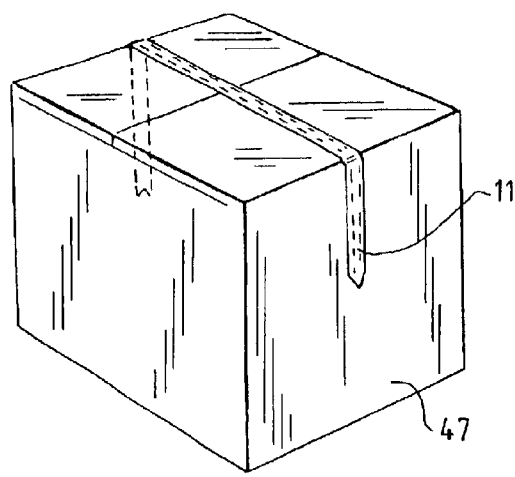
FIG. 1 is a perspective view illustrating one embodiment of the present invention applied to a carton.
Figure 2:
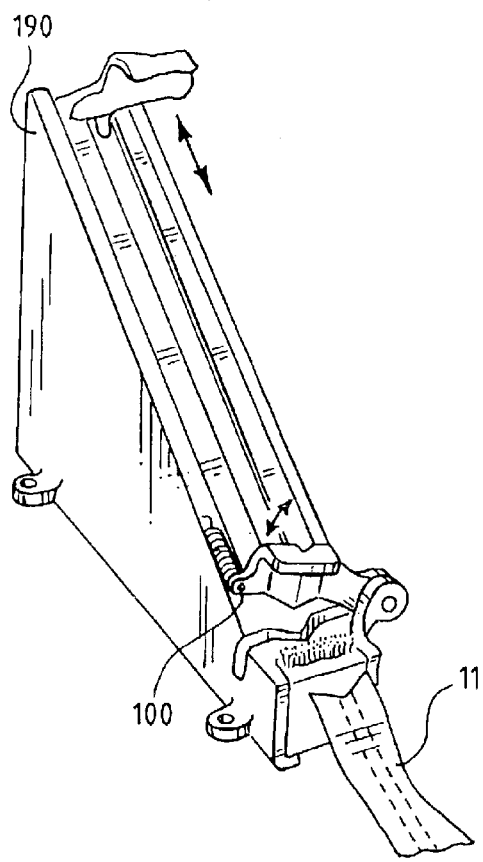
FIG. 2 is a perspective view illustrating a tape making machine that may be used to create the present invention.

As shown in FIG. 1, one embodiment of the present comprises a section of tape 11 which has been adhered to carton 47. Tape 11 is formed by cutting one end of a roll of tape stock into a particular shape with a tape making machine 190 the design of which is well known to those of skill in the art and is shown in FIG. 2.

Figure 3:
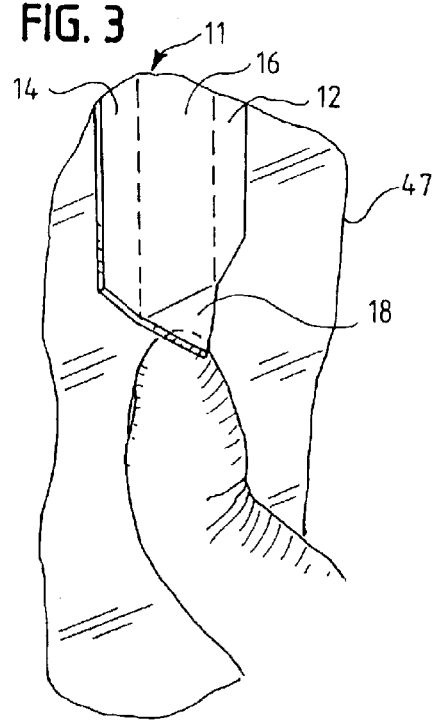
FIG. 3 is an exploded perspective view of the embodiment shown in FIG. 1 illustrating how a graspable handle may be formed by the present invention.

Tape 11 is cut to have a first end 13 and an opposing second end 15. End 13 terminates in an extended area 18 that forms the tab, handle or graspable section of tape 11 as is shown in FIGS. 3 and 6. On tape 11, adhesive is applied to areas 12 and 14 and, in a preferred embodiment, area 16 is free of adhesive. Alternately, adhesive may be applied to area 16, but when done, to achieve the objects of the present invention, it is weaker in strength than the adhesive used on areas 12 and 14.

Figure 4:
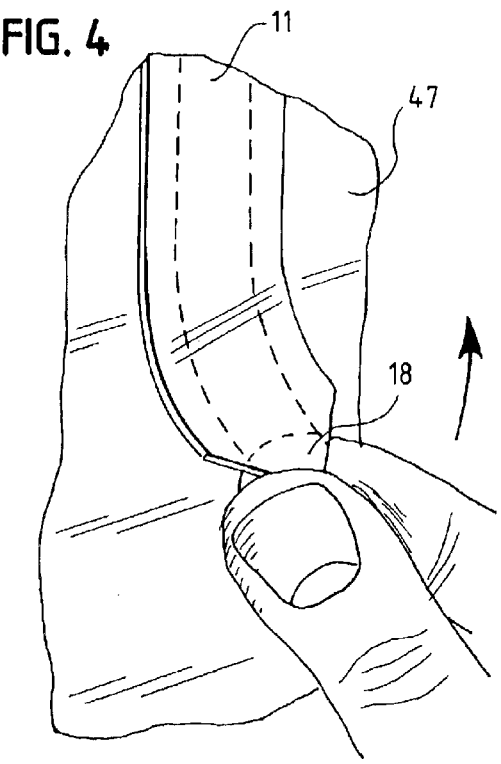
FIG. 4 is an exploded perspective view of the embodiment shown in FIG. 1 illustrating how the graspable handle is used to remove the tape.

As shown in FIG. 3, in a preferred embodiment, the tab, handle or graspable section 18 is formed by a non-adhesive area which extends past or beyond the adhesive on tape 11. Since, this area is free from adhesive, it is easily positioned and grasped by a user. As is illustrated in FIG. 4, once handle 18 is grasped, a user may then firmly grip tape 11 and pull the tape off of a carton. This reduces the need to cut the tape in order to remove it.

While the preferred embodiment is shown as forming a point 18 as the handle or tab, other shapes may be used as well so as to provide an adhesive free area or weakened adhesive area. For example, FIGS. 7 and 8 illustrate an alternate embodiment of the present invention. As shown, two adhesive sections 22 and 24 are provided on tape 20. Non-adhesive section 26 forms tab, handle or graspable section 28. As shown in FIG. 8, handle 28 is first lifted to facilitate the removal of tape section 20.

FIGS. 9 and 10 illustrate yet another embodiment of the present invention. In this embodiment, adhesive sections 32 and 34 are provided on tape 30. Non-adhesive section 36 forms handle 38. As was described above, section 36 may include a low strength adhesive as well. FIG. 10 shows how handle 38 maybe first lifted so as to remove tape 30.

FIGS. 12 and 13 illustrate yet another embodiment of the present invention. In this embodiment, adhesive section 52 is provided on tape 53. Non-adhesive section 58 extends beyond the adhesive so as to form a handle 60. As was described above, section 58 may include a low strength adhesive as well. FIG. 13 shows how handle 60 maybe first lifted so as to remove tape 53.

As shown in FIG. 11, a typical tape length 140 made in accordance with the present invention will generally include a substrate 141. Substrate 141 may be comprised of a flexible material such as paper, plastic, and other films known to those of skill in the art. As also shown, in a preferred embodiment, one side of substrate 141 includes opposingly located adhesive sections 142 and 143 with a non-adhesive section 144 located between sections 142 and 143.

As is shown in FIGS. 6, 8, 10, and 13 the tape sections may be formed as discreet or individual units or sections. Alternately, as shown in FIGS. 5, 7, 9, and 12, the tape used with the present invention may also be formed as sections or units which are part of a larger roll stock the formation of which is well known to those of skill in the art.

FIG. 2 illustrates a conventional tape making machine 190 that may be used to create a length of tape. The tape making machine may either be hand operated or automatic. The design of such machines is well known to those of skill in the art. However, as shown in FIG. 2, the machine 190 should include a die 100 that is in the shape of the cut to be made across the tape so as to form an area that extends beyond the adhesive area on the tape. As is further illustrated in FIG. 5, two cuts 102 and 104, which are pointed or angled in configuration, are used to form a complete section of tape 11. Cut 102 forms both the beginning end 13 of tape 11 and the end of the previous tape section. Cut 104 forms end 15 of tape 11 and the beginning of the next tape length.

The embodiments shown in FIGS. 7–9 are created in a similar manner. As shown in FIG. 7, a notched cut 110 may be used to form the tape lengths. FIG. 9 illustrates that a curved cut 112 may be used as well. Of course, other cut shapes may be used as well so long as a non-adhesive section is formed which extends past the adhesive section so as to form a handle.

In use and as was briefly described above, when a user desires to remove tape 11, the tape is easily removed by grasping section 18 which is easily lifted since it either has no adhesive or a weak adhesive holding it to the container. Once a user gets a purchase on the tape, the tape may easily pulled off of the container. Moreover, since distal ends 17 and 19 have adhesive thereon, they will not fray during use. The embodiments shown in FIGS. 7–10 are used in a similar manner.

With respect to the embodiment illustrated in FIGS. 12–13, that edge 58 has no adhesive thereon or has had a weaker adhesive applied thereto also allows edge 58 to act as the tab, handle, or graspable section. This allows a user uses to get a purchase point on the tape at either end of the tape as well as along the side of the tape. An advantage of this embodiment is that the graspable section is easily located on the container rather than situated on one particular end.

While the preferred embodiments of the present invention have been illustrated and described, it will be understood by those of ordinary skill in the art that changes and other modifications can be made without departing from the invention in its broader aspects. Various features of the present invention are set forth in the following claims.

What is claimed is:

1. A length of tape comprising:
   a substrate having an adhesive side and a non-adhesive side;
   two opposingly-located first and second adhesive sections on said adhesive side of said substrate;
   a third adhesive section located on said adhesive side of said substrate between said first and second adhesive sections, said third adhesive section is weaker in strength than said first and second adhesive sections; and
   a graspable handle formed at one end of said third adhesive section.

2. The length of tape according to claim 1, wherein said graspable handle comprises a cut shape that extends beyond said two opposingly-located first and second adhesive sections.

3. A length of tape comprising:
   a substrate comprising a plurality of individual tape units, each tape unit having an adhesive side and a non-adhesive side;
   an adhesive section on said adhesive side of each individual tape unit and a non-adhesive section located on said adhesive side, wherein said adhesive section comprises two opposingly-located first and second adhesive sections and a third adhesive section located between said two opposingly-located adhesive sections; and
   a graspable handle formed at one end of said non-adhesive section of each individual tape unit.

4. A length of tape comprising:
   a substrate comprising a plurality of individual tape units, each tape unit having an adhesive side and a non-adhesive side;
   an adhesive section on said adhesive side of each individual tape unit and a non-adhesive section on said adhesive side of each individual tape unit and a non-adhesive section located on said adhesive side, wherein said adhesive section comprises two opposingly located adhesive sections; and
   a graspable handle formed at one end of said non-adhesive section of each individual tape unit.

\* \* \* \* \*